United States Patent [19]
Brennan et al.

[11] 3,838,885
[45] Oct. 1, 1974

[54] HYDRAULIC SYSTEM FOR CONTROLLING TRUCK CARRIED APPARATUS

[75] Inventors: George Brennan, Montebello; Evan S. Prichard, Newport Beach, both of Calif.

[73] Assignee: Challenge-Cook Bros., Inc.

[22] Filed: Feb. 5, 1973

[21] Appl. No.: 329,323

[52] U.S. Cl. .............................. 298/22 R, 280/81 R
[51] Int. Cl. .............................................. B60s 9/00
[58] Field of Search............. 298/22 R, 17 S, 17 SG; 280/80 B, 81 R, 405, 419

[56] References Cited
UNITED STATES PATENTS

| | | | |
|---|---|---|---|
| 2,189,052 | 2/1940 | Anthony | 298/17 SG |
| 3,112,100 | 11/1963 | Prichard | 280/81 R |
| 3,191,961 | 6/1965 | Brennan | 280/81 R |
| 3,191,963 | 6/1965 | Prichard | 280/81 R |
| 3,271,077 | 9/1966 | Timmer | 298/22 R |
| 3,421,793 | 1/1969 | Pioch | 298/17 S |
| 3,685,853 | 8/1972 | Goldsmith | 280/81 R |

Primary Examiner—Philip Goodman
Attorney, Agent, or Firm—Lyon & Lyon

[57] ABSTRACT

A hydraulic system for controlling truck carried apparatus, such as an auxiliary caster wheel assembly installed at the rear of a dump truck and a hoist for the truck dumping mechanism; the hydraulic system being operable to extend or retract, and to raise or lower the wheel assembly as well as adjust the wheel assembly to carry an increased or decreased percentage of the total truck load. In addition the hydraulic system being operable to lock the caster mechanism so that the truck may be backed or to permit application of a pushing force on the wheels while the hydraulic system operates the dumping hoist so as to control placement of material discharged from the dump truck.

6 Claims, 7 Drawing Figures

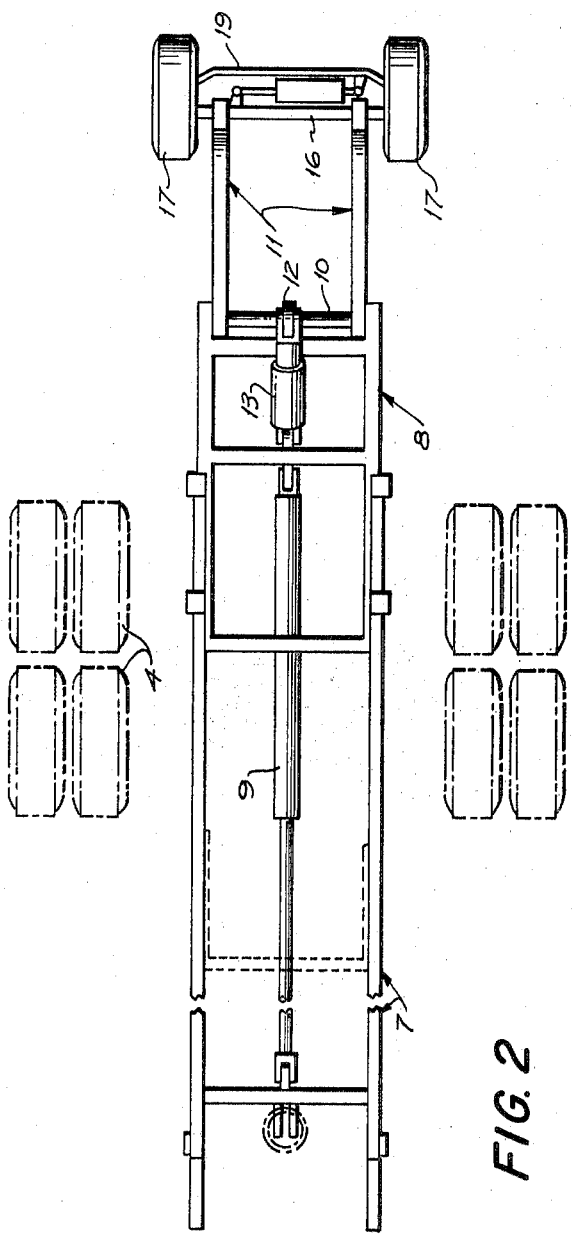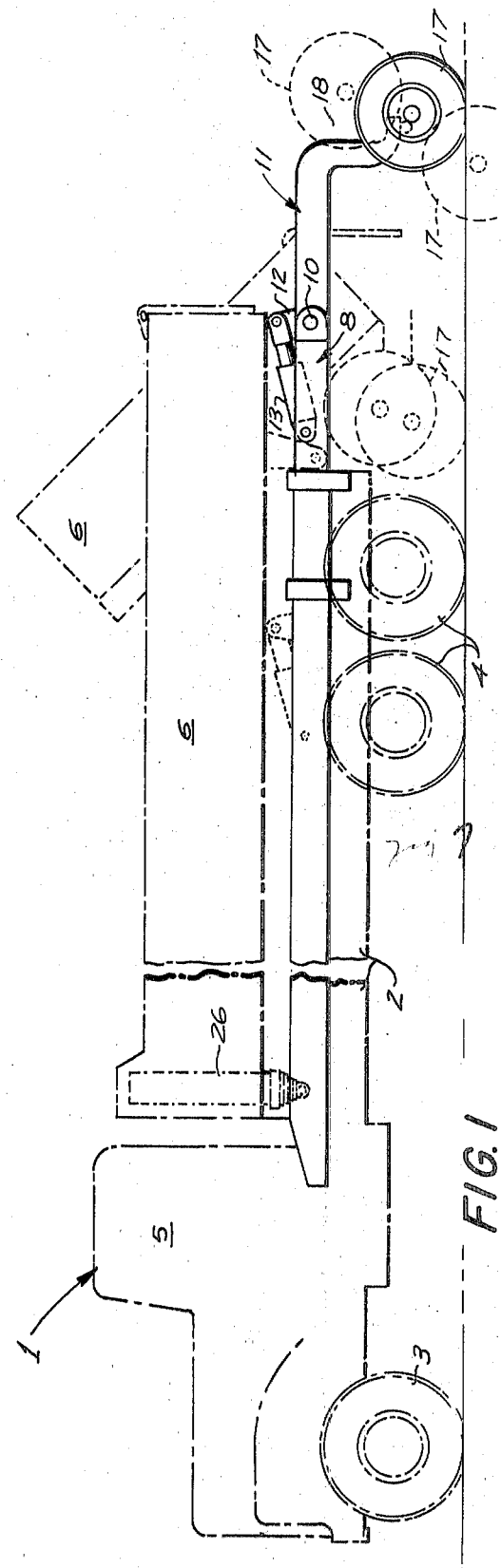

HYDRAULIC SYSTEM FOR CONTROLLING TRUCK CARRIED APPARATUS

BACKGROUND OF THE INVENTION

Vehicles, particularly trucks have been provided with rearwardly mounted auxiliary axle and wheel assemblies which enable the vehicle to carry an increased load while maintaining the unit load per wheel within prescribed limits. Representative of such assemblies which are hydraulically controlled are disclosed in U.S. Pat. Nos. 3,112,100 and 3,191,961.

SUMMARY OF THE INVENTION

The present invention is directed to an improved hydraulic system for control of truck carried apparatus such as auxiliary wheel assemblies disposed rearwardly of the normal truck wheel base and dumping hoists; the invention being summarized in the following objects:

First, to provide a hydraulic system which incorporates a novel means utilizing an auxiliary caster wheel assembly disposed rearwardly of a truck body; wherein lateral pivoting of the wheels in response to forward movement of the vehicle is damped; or wherein the wheel may be locked in position so as to permit reverse or rearward movement of the vehicle or wherein the locked wheels may engage with rotating elements of, for example, a paving machine, so that the paving machine may push directly against the auxiliary wheels to move the truck and it's load as needed.

Second, to provide a hydraulic system, as indicated in the previous object, wherein the control of the pivoting movement of the caster wheels in incorporated in a hydraulic control for extending or retracting the wheels relative to the truck body.

Third, to provide a hydraulic system as indicated in the other objects, wherein the downward force exerted by the auxiliary wheels may be varied to alter the load carrying capacity of the auxiliary wheels, or to raise the wheels when not needed such as is the case when the vehicle is empty.

Fourth, to provide a hydraulic system, as indicated in the other objects, wherein the hydraulic system may incorporate a hydraulic lift for dumping a load from the vehicle.

Fifth, to provide a hydraulic system as indicated in the other objects which requires a minimum number of control values interconnecting the various hydraulic control units in a manner to prevent conflict; for example, the lifting operation of the dumping control also causing retraction of the auxiliary wheels to clear the discharging material.

DESCRIPTION OF THE FIGURES

FIG. 1 is a substantially diagramatical side view shown in broken lines of a dump truck and indicating by solid lines and in an extended position a frame and auxiliary wheel structure intended for operation by the hydraulic system.

FIG. 2 is a plan view of the auxiliary frame and wheel structure also in extended position and indicating by broken lines the relative position of the rear wheels of the truck.

Figure 3:
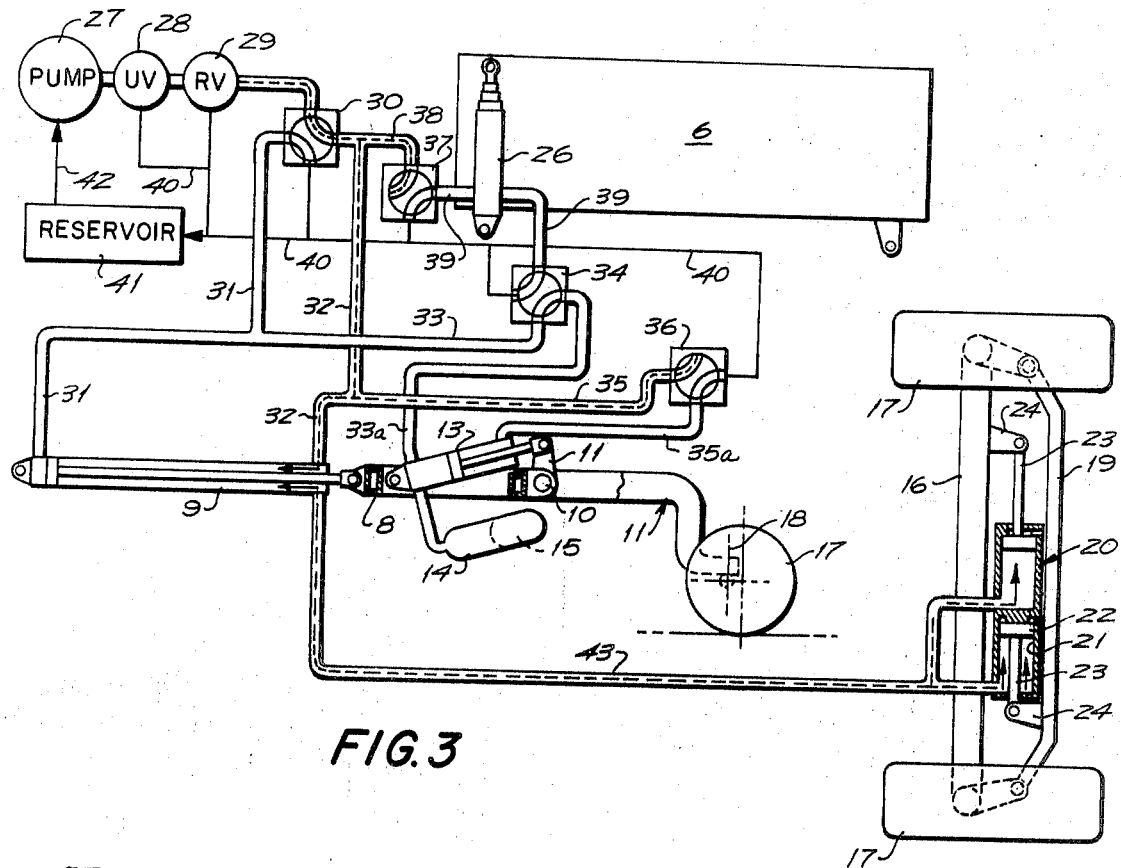
FIG. 3 is a diagramatical view showing the hydraulic system and related structure in which the frame structure is shown in its retracted position and a dump truck body in its lower position.

The hydraulic system for controlling truck carried apparatus is intended primarily to control extensible and retractable auxiliary wheels and to adjust the load carried by the auxiliary wheels as well as controlling the operation of the dump truck body.

The load carrying vehicle or truck 1 is provided with a conventional chassis frame 2 supported by front wheels 3 and a rear wheel set 4. A suitable cab 5 is provided as well as a dump body 6.

Interposed between the dump body and the chassis frame is a fixed auxiliary frame 7, of rectangular configuration which serves to guide a rearwardly extensible auxiliary frame 8. The frame 8 may be extended rearwardly or retracted by a hydraulic actuator 9.

Connected to the rear end of the frame 8 by a pivot shaft 10 is a wheel frame 11. A lever arm 12 extends upwardly from the pivot shaft 12 and is connected to the frame 8 by a hydraulic actuator 13 so that the wheel frame 11 may be pivoted about a horixontal axis disposed transversely with respect to the auxiliary frame and the truck chassis frame 2. Connected to the hydraulic actuator 13 is an accumulator 14. The accumulator includes an air cell 15.

The extended end of the wheel frame 11 is provided with an axle 16 which supports a pair of auxiliary wheels 17 for pivotal movement about essentially vertical and parallel caster pivot axis 18. The caster pivots are not shown as the assemblies for which join the wheels to the axle are conventional.

The auxiliary wheels are joined by a tie bar 19 so as to retain the wheels in essentially parallel relation. The tie bar 19 and the axle 16 are joined by a hydraulic actuator and damper unit 20 which comprises a pair of cylinders disposed in axial alignment and one shaft is normally in a retracted position whereas the other shaft is normally in an extended position as indicated essentially diagrammatically in FIG. 3. The extremities of the shafts are joined by brackets 24 to the axle 16 and the tie bar 19 respectively. Openings 27 are provided in the cylinders so that the pistons may be moved to one extremity of the respective cylinders when the cylinders are pressurized. The means for pressurizing the cylinders will be discussed later in more detail.

The dump body 6 is provided with a hydraulic lift 26. The dump body and its hydraulic lift may be a conventional part of the truck except for the interposing of the frames 7 and 8.

The hydraulic system includes a pump 27 and unloading valve 28 and a pressure relief valve 29 all of which are conventional. A control valve 30 is connected to the pump 27 and valves 28 and 29 by a supply line 30a and is connected to the hydraulic actuator 9 by lines 31 and 32 for extending and retracting the hydraulic actuator. A branch 33 of the extension line 31 communicates with a second control valve 34 which in turn is connected through a line 33a with the hydraulic actuator 13 in a manner to apply a force urging the auxiliary wheels 19 downward. A branch 35 from the line 32 supplies a control valve 36 connected to the hydraulic actuator 13 through a line 35a for the purpose of raising the auxiliary wheels 17.

A fourth control valve 37 is interposed between the first control valve 30 and hydraulic lift 26. The control valve 37 is connected by a branch line 38 with the line 32 and a further branch line 39 line connects the control valve 37 with the hydraulic lift 26. The branch line 39 also connects with the second control valve 34 in such a manner that the hydraulic lift 26 and the hydraulic actuator 13 may be simultaneously connected with the pressure source.

The valves are provided with return outlets connected to a common return line 40 which terminates at the reservoir 41. The intake side of the pump 27 is connected by a line 42 with the reservoir 41.

Operation of the hydraulic system is as follows: When the control valve 30 is placed in the position shown in FIG. 3, the extensible auxiliary frame 8 is in its retracted position. If it is desired that the auxiliary wheels clear the ground the control valve 36 may be operated to cause the hydraulic actuator 13 to lift the wheels.

Figure 4:
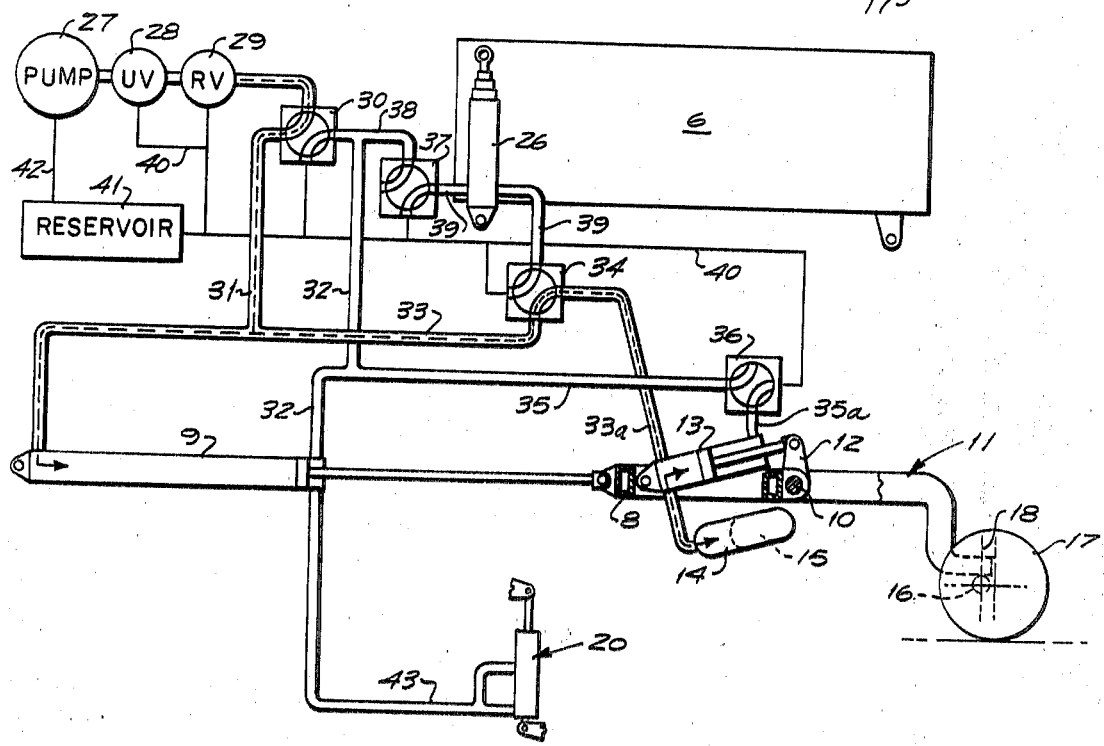
FIG. 4 is a similar diagramatical view showing the auxiliary frame structure and its auxiliary wheels in their extended position.

When desired to extend the auxiliary wheels and utilize these wheels to carry part of the truck load, the control valve 30 is set as shown in FIG. 4 which causes the actuator 9 to extend the auxiliary frame 8. Also the second control valve 34 may be actuated to pressurize the hydraulic actuator 13 in a manner to provide a downward force on auxiliary wheels and a corresponding lifting force on the truck causing the auxiliary wheels to accept a portion of the total load. The accumulator by reason of its air chamber permits the wheels to raise or lower in conformity with change in level of the road surface.

The hydraulic actuator and damper unit 20 is connected by a line 43 which is a continuation of line 32; thus, when line 32 is pressurized as indicated in FIG. 3, the cylinders 21 are pressurized which has the effect of locking the caster mounted auxiliary wheels 17 in planes parallel with the longitudinal axis of the truck thereby preventing any caster movement of the auxiliary wheels. In this condition the truck may be backed without causing caster turning of the auxiliary wheels. It will be noted that this condition is attained when the wheels are retracted.

When the auxiliary wheels are extended as in FIG. 4 the line 32 is not pressurized so that the auxiliary wheels are permitted to move about their respective caster axis as the vehicle travels forwardly with its load.

Figure 5:
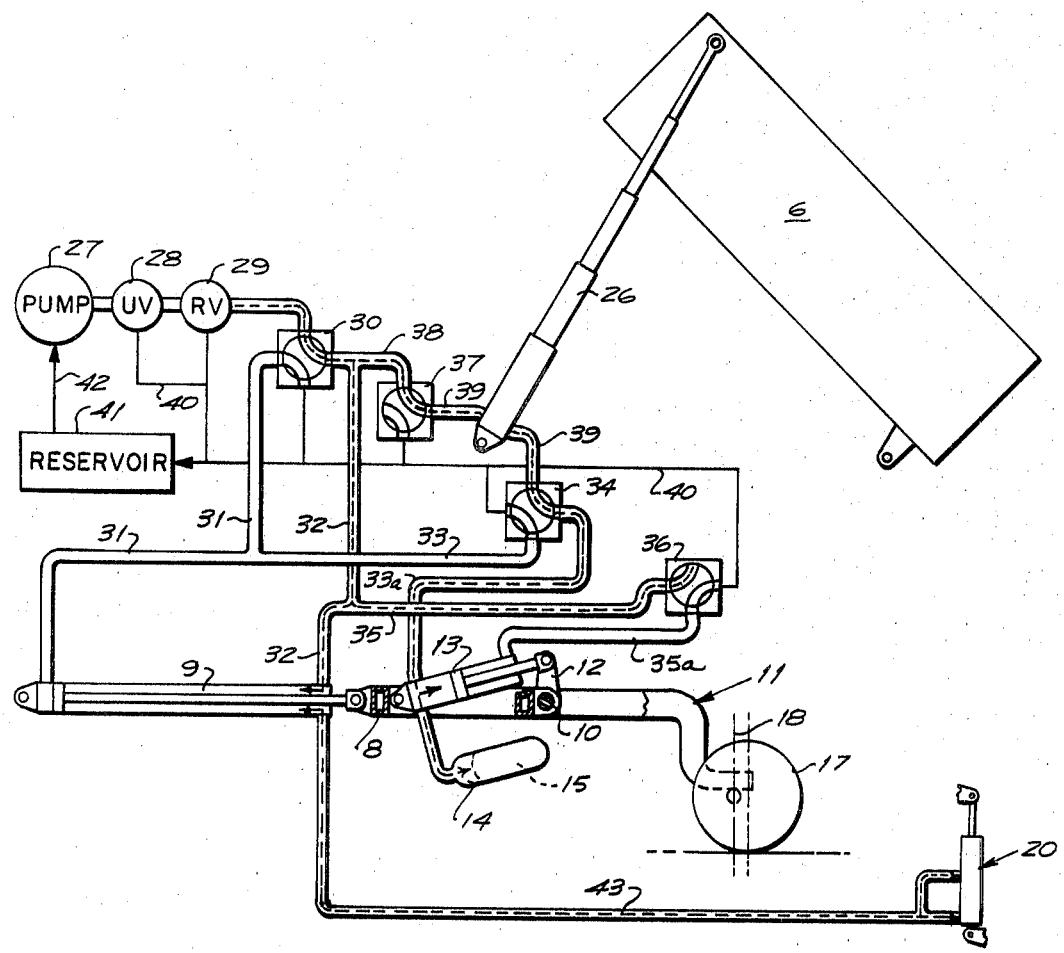
FIG. 5 is another diagramatical view showing the dump truck body in its raised position and the auxiliary wheels in their retracted position and subjected to a downward force.

References now directed to FIG. 5. FIG. 5 corresponds to FIG. 3 in that the auxiliary wheels are in their retracted position and the cylinders of the hydraulic actuator 20 are pressurized so that the wheels cannot turn about their respective caster axis. Under the conditions shown in FIG. 5 the control valve 37 is actuated so that the dump body 6 is raised for discharge of its contents in the region rearwardly of the auxiliary wheels.

One of the intended uses of the apparatus herein disclosed is to supply paving material to a paving machine. The paving machine is not shown except for rollers 44 shown in FIG. 5. These rollers bear against the auxiliary wheels and are intended to exert enough force to push the entire truck forward as the contents of the dump body is discharged into the paving machine or onto the ground ahead of the paving machine. In order to ensure that the auxiliary wheels remain in place the control valve 34 is turned so that it is subjected to the same pressure as the present in the hydraulic lift. Consequently a downward force is applied to the auxiliary wheels counteracting any component of the pushing force that would tend to raise these wheels. Also it will be noted that the cylinders of the hydraulic actuator 20 are pressurized to prevent a caster movement of the auxiliary wheels.

Figure 6:
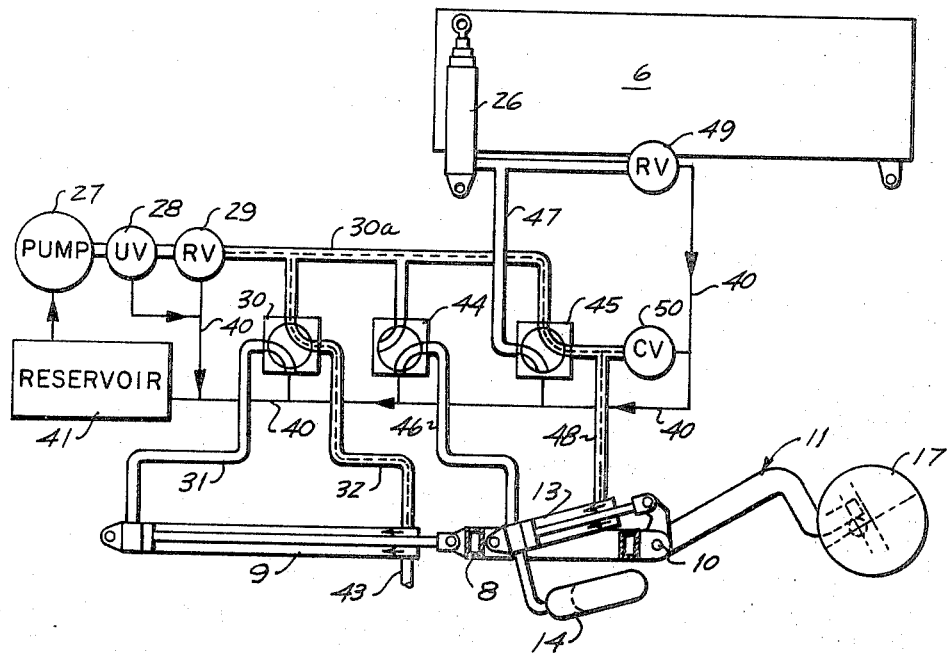
FIGS. 6 and 7 are further diagrammatical views showing a different arrangement of the control valves.
Figure 7:
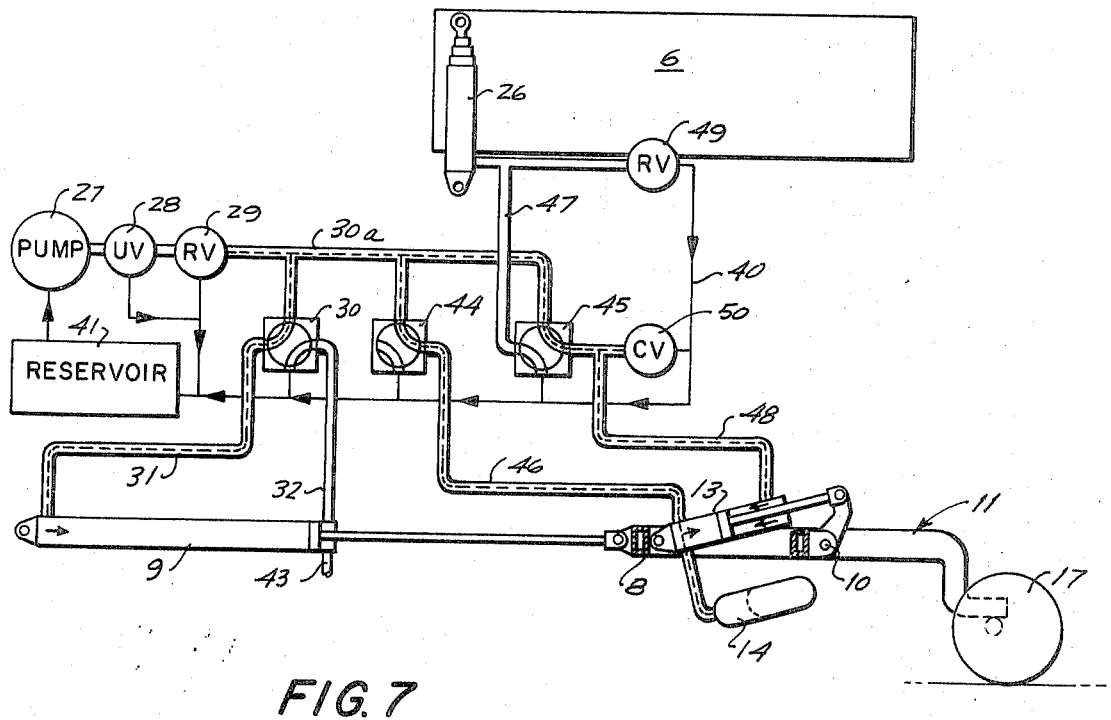

Reference is now directed to FIGS. 6 and 7, in which the pump 27 and valves 28 and 29 are connected through a supply line 30a, control valve 30 and lines 31 and 32 to the hydraulic actuator 9. The actuator is connected to the damper unit 20 (omitted from FIGS. 6 and 7) through line 43.

In place of control valves 34, 36 and 37, two control valves 44 and 45 are connected in parallel with control valve 30 to the supply line 30a. Control valve 44 is connectable through a line 46 to the hydraulic actuator 13 so as to apply a downward force to the auxiliary wheels 17. Control valve 45 is connectable through a line 47 to the hydraulic lift 26. The control valve 45 is also connectable through a line 48 to the hydraulic actuator 13 so as to apply an upward force to the auxiliary wheels 17.

As in the previous embodiment of the control system, the valves 30, 44, and 45 are connected to the return line 40. In addition line 47 may be provided with a relief valve 49, and line 48 may be provided with a check valve 50 both discharging to the return line 40.

As shown in FIG. 6, the valve 45 may be set to provide lifting pressure to the auxiliary wheels 17 so as to raise the wheels when not needed, as when the truck is empty. As shown in FIG. 7, the control valve 45 may be used to provide a back pressure determined by valve 50 partially counterbalancing the force exerted through control valve 44 so as to maintain the desired wheel pressure.

Under the two conditions shown in FIGS. 6 and 7, the hydraulic lift 26 is not needed and therefore is retracted. Conversely, when the hydraulic lift 26 is extended, the lifting pressure on the auxiliary wheels is not needed.

While a particular embodiment of this invention has been shown and described, it is not intended to limit the same to the details of the construction set forth, but instead, the invention embraces such changes, modifications and equivalents of the various parts and their relationships as come within the purview of the appended claims.

I claim:

1. The combination with a truck having a rearwardly extensible frame, a horizontally pivotable frame carried by the extensible frame and projecting rearwardly thereof, means for extending and retracting the extensible frame and means for pivoting the pivotable frame about a horizontal axis, of an auxiliary wheel assembly, comprising:
   a. a pair of caster wheels carried by the horizontally pivoted frame, the wheels being pivotable about essentially vertical axes:
   b. linkage joining the wheels to maintain the wheels in essentially parallel relation;
   c. and control means for urging the wheels about their vertical axes to a position wherein their planes are parallel to the longitudinal axis of the truck;

d. said control means including a pair of relatively fixed hydraulic cylinders, each having a piston and a shaft, the shafts being connected respectively to the horizontally pivotable frame and linkage, and a pressure fluid source adapted to apply a damping force to effect yieldable restraint, and a locking force to secure the wheels in their planes parallel to the longitudinal axis of the truck, thereby to permit backing of the truck or application of force against the wheels to push the truck in a forward direction.

2. A load carrying vehicle, comprising:
   a. a dump body;
   b. a horizontally pivoted load carrying apparatus having a pair of wheels, the wheels being caster pivoted and linked together to move in unison about their respective caster pivots;
   c. a first hydraulic means for raising and lowering the damp body;
   d. a second hydraulic means for pivoting the auxiliary load carrying apparatus and apply a downward force on the wheels thereby to apply a corresponding lifting force on the vehicle;
   e. and control means interconnecting the hydraulic means to apply simultaneously a downward force on the wheels and a raising force on the dump body;
   f. the control means including a third hydraulic means operable to fix the wheels in planes parallel with the longitudinal axis of the vehicle, whereby the wheels may be engaged to push the vehicle in a forward direction.

3. The combination with a load carrying vehicle having a dump body, a rearwardly extensible frame, a horizontally pivotable frame, and a pair of auxiliary caster mounted wheels, of a hydraulic control system comprising:
   a. a first hydraulic means for raising and lowering the dump body;
   b. a second hydraulic means extending and retracting the extensible frame;
   c. a third hydraulic means for pivoting the pivotable frame;
   d. a fourth hydraulic means for urging the wheels into parallel relation with the longitudinal axis of the vehicle, whereby the wheels may be engaged to press the vehicle forwardly;
   e. and valve means interconnecting the first and third hydraulic means to cause the pivotal frame to be forced downward to increase the load on the auxiliary wheels simultaneously with raising the dump body whereby material may be dumped while the vehicle is pushed forward.

4. The combination with a load carrying vehicle of an auxiliary load carrying apparatus, comprising:
   a. a rearwardly extensible frame carried by the vehicle;
   b. a horizontally pivotable frame carried by the extensible frame;
   c. a pair of caster pivoted wheels carried by the horizontally pivotable frame;
   d. a first hydraulic means for extending and retracting the extensible frame;
   e. a second hydraulic means for urging the wheels about their caster axes to positions wherein their planes are parallel to the longitudinal axis of the load carrying vehicle;
   f. and control means for simultaneously activating the first and second hydraulic means to retract the extensible frame and position the caster wheels parallel to the longitudinal axis of the load carrying vehicle.

5. The combination as defined in claim 4, which further includes a third hydraulic means for said horizontally pivotable frame, and wherein:
   a. the control means simultaneously activates all three hydraulic means to apply a downward force on the caster wheels while the wheels are in parallel relation to the axis of the load carrying vehicle.

6. The combination as defined in claim 4, wherein:
   a. the control means includes a first subcontrol for applying a caster damping force to the wheels and a second subcontrol for applying a caster locking force.

* * * * *